United States Patent
Sasaki et al.

[11] Patent Number: 5,914,285
[45] Date of Patent: Jun. 22, 1999

[54] SUBSTRATE MATERIAL FOR A MAGNETIC HEAD

[75] Inventors: Toyoshige Sasaki; Shigeki Mohri; Osamu Nakano, all of Fukuoka; Shin Mishima, Takarazuka; Shigeru Kawahara, Kusatsu; Naoyuki Okamoto, Ibaraki, all of Japan

[73] Assignees: Nippon Tungsten Co., Ltd., Fukuoka-ken; Sumitomo Special Metals Co., Ltd., Osaka, both of Japan

[21] Appl. No.: 08/918,756

[22] Filed: Aug. 25, 1997

[30] Foreign Application Priority Data

Jan. 24, 1997 [JP] Japan ..................... 9-11660

[51] Int. Cl.$^6$ .................................................. C04B 35/56
[52] U.S. Cl. .................................... 501/87; 501/93
[58] Field of Search ......................... 501/87, 93, 102

[56] References Cited

U.S. PATENT DOCUMENTS

| | | | |
|---|---|---|---|
| 4,063,908 | 12/1977 | Ogawa et al. | 501/87 |
| 4,650,774 | 3/1987 | Kawaguchi et al. | 501/87 |
| 4,839,315 | 6/1989 | Suzuki et al. | 501/87 |
| 5,595,947 | 1/1997 | Tsujimoto et al. | 501/87 |

FOREIGN PATENT DOCUMENTS

| | | |
|---|---|---|
| 4060800466 | 3/1994 | Japan . |
| 408143362 | 6/1996 | Japan . |
| 409110529 | 4/1997 | Japan . |
| 409180406 | 7/1997 | Japan . |

Primary Examiner—Paul Marcantoni
Attorney, Agent, or Firm—Jordan and Hamburg, LLP

[57] ABSTRACT

To provide a substrate material having characteristics suitable to a magnetic head for attaining high recording density. A substrate material for a magnetic head comprising a matrix phase of a carbide of one or more of Ti, W and Ta and a dispersion phase of an oxide of one or more of $Al_2O_3$, $CrO_3$, and $ZrO_2$, in which the material comprises 60 to 95 vol % of the matrix phase of the carbide. Further, a single phase in which the ingredients of carbides as the matrix phase comprise $(Ti_jW_mTa_n)C_x$ is preferred. Further, oxygen and/or nitrogen may be solid-solubilized in the carbide MeC of the matrix phase wherein Me is one or more of Ti, W, and Ta.

5 Claims, 1 Drawing Sheet

SUBSTRATE MATERIAL FOR A MAGNETIC HEAD

BACKGROUND OF THE INVENTION

1. Field of the Invention

The present invention relates to a substrate material for a magnetic head such as a thin film-type magnetic head slider for a hard disk driving device or a thin film-type head for a tape recording device.

2. Description of the Related Art

As a substrate material for a thin film magnetic head, $Al_2O_3$—TiC series substrates have generally been used. In particular, along with recent technical innovations in magnetic heads to attain high recording density (such as reduced size, lowered flying height, and mounted MR elements), various demands have been made also for substrates. In order to cope with such technical changes in magnetic heads, the present applicant has developed an $Al_2O_3$—TiC series substrate material including the advantages of (1) excellent workability for fine fabrication such as ion beam etching (IBE) or reactive ion etching (RIE), with less surface roughness after fabrication and a voidless and fine structure, and (2) reduced dropping of particles and deformation after magnetic annealing (refer to Unexamined Japanese Patent Publication Hei 8-34662).

Further, technical developments has been advanced in order to attain a recording density of 10 $Gb/in^2$ or higher, and studies have been now been conducted on magnetic heads regarding magnetic elements (MR and GMR elements), thermal stability of micro-recording bits and head-disk interface (HDI).

To satisfy these demands on the magnetic head, the substrate material needs to have the following characteristics in addition to the existent features described above.

(1) Static-free conductivity, since the MR and GMR elements have less durability against discharge destruction at a low voltages.

(2) High rigidity and easy fabrication for controlling the height of magnetic poles, particularly needed because of size reductions and the introduction of GMR in the magnetic head.

(3) Reduced chipping damage, which may lead to the occurrence of matter separating from the head to possibly cause abnormalities in the magnetic resistance change of the MR element (thermal asperity), and high heat conductivity.

(4) Less reactivity, with a lubricant used at the boundary between the disk and the head.

Existing substrate materials cannot satisfy these requirements.

SUMMARY OF THE INVENTION

It is an object of the present invention to provide a substrate material having characteristics suitable to a magnetic head for attaining high recording density.

A substrate material for a magnetic head according to the present invention comprises a matrix phase of a carbide of one or more of Ti, W and Ta, and a dispersion phase of an oxide of one or more of $Al_2O_3$, $Cr_2O_3$ and $ZrO_2$ in which the material comprises from 60 vol % to 95 vol % of the matrix phase of the carbide.

Further, the ingredients of the carbide in the matrix phase comprise a single phase of $(Ti_jW_mTa_n)C_x$ in which $j+m+n=1$, $0 \leq j \leq 1$, $0 \leq m \leq 0.5$, $0 \leq n \leq 1$, and $0.5 \leq x \leq 1$.

Further, oxygen and/or nitrogen is solid-solubilized in the carbide MeC of the matrix (in which Me: one or more of Ti, W and Ta), and the solid solubilization amount is $0.5 \leq p+q+r \leq 1$, $0.5 \leq p \leq 1$, $0 \leq q \leq 0.4$ and $0 \leq r \leq 0.2$ in $MeC_pO_qN_r$.

DESCRIPTION OF PREFERRED EMBODIMENTS

In the present invention, the targeted substrate material is obtained as a result of various experiments based on the following findings:

(1) A matrix for a substrate material comprises a conductive material.

(2) Other phases are dispersed to improve the resistance to chipping, in which an oxide is dispersed as the other phase, considering adhesion with the insulation film ($Al_2O_3$).

(3) Solid-solubilization ingredients of oxygen and nitrogen are effective as a sintering assistant for obtaining a voidless and fine structure.

(4) A carbide is effective with reactivity, with a lubricant at the head-disk interface.

(5) A carbide system is effective for obtaining high rigidity and high heat conductivity, for which the addition of Ti, W, Ta is effective.

The carbide is used as the matrix phase in order to provide the substrate material with conductivity. Provision of the conductivity is effective against low voltage discharge destruction of MR and GMR elements, which may cause problems in the manufacturing of the magnetic head. The blended amount of the carbide phase is determined according to the relation between the oxide and the dispersion phase. Basically, there is no problem so long as the matrix phase is not separated by the dispersion phase, namely, the matrix phase is connected, and the content of 60 vol % or more is required. Further, since at least 5 vol % of the oxide dispersion phase is required, the upper limit for the blended amount of the carbide phase is 95 vol %.

Further, the carbide is used for the matrix phase because this provides, in the case of a magnetic head comprising the carbide as the matrix phase, a remarkable effect in the interaction with the lubricant at the head-disk interface (HDI), causes no reaction or coagulation, for example, with perfluoro polyether (PFPE) used as a lubricant to HDI, and is particularly suitable also as a substrate for a magnetic head in a contact recording system.

Figure 1:
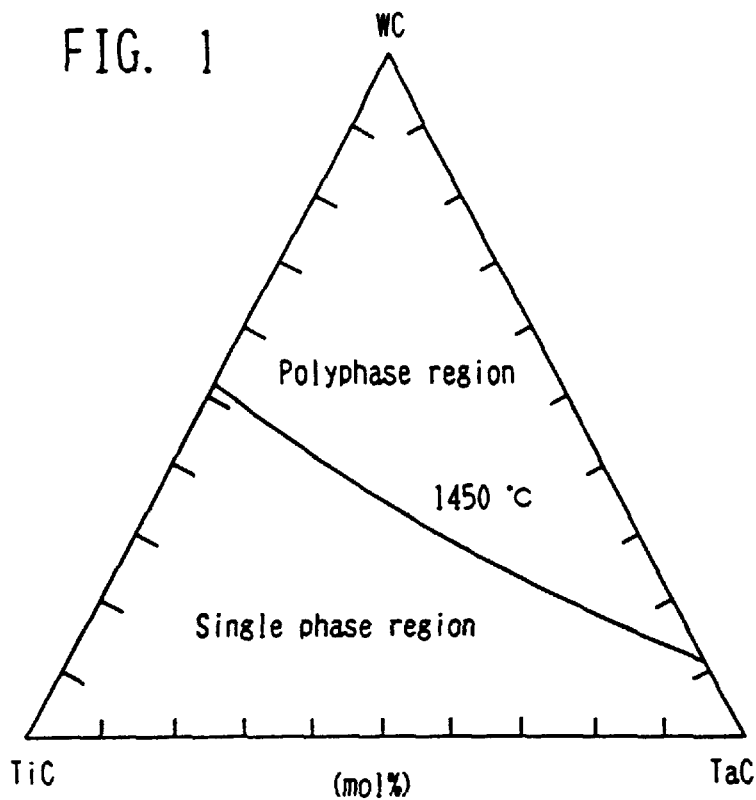
FIG. 1 is a phase diagram of a TiC—WC—TaC series pseudo ternary system.

Then, the addition of one or more of Ti, W and Ta as a main component of the carbide increases rigidity compared with an existent substrate material mainly comprising aluminum, and the addition of W and Ta is particularly effective to increase the rigidity of the material. Further, the addition of W greatly contributes to the improvement of the heat conductivity of the material. However, the amount which can be added is restricted since it is more desirable for the carbide phase to be constituted of a single phase. A single phase is desired for surface roughness after IBE or RIE, and, due to the limit of solid solution for TiC, $j+m+n=1$, $0 \leq j \leq 1$, $0 \leq m \leq 0.5$, $0 \leq n \leq 1$ and $0.5 \leq x \leq 1$ in $(Ti_jW_mTa_n)C_x$. For example, if $j+m+n=1$, a single phase area is preferable as shown in FIG. 1, indicated by the phase diagram of a TiC—WC—TaC series pseudo ternary system. Increasing the rigidity can reduce the warp of the head in the cutting fabrication step and can facilitate fabrication for controlling the height of the magnetic poles, particularly those of the upper reproduction shield (lower recording magnetic pole) and the upper recording magnetic pole, in the size reduction of the magnetic head and in the magnetic head carrying the GMR element.

An oxide such as $Al_2O_3$, $Cr_2O_3$ or $ZrO_2$ is dispersed by addition to the carbide phase in order to improve the toughness of the substrate material. The effect of dispersion depends on the uniformity in size and amount of dispersed particles, and a more than 5 vol % addition is desirable for the improvement of toughness. Particularly, since such oxides do not react with the matrix-forming carbide, they do not form a compound and act as obstructive dispersed matter effective against the propagation of cracks. Further, in view of the surface roughness after IBE or RIE, the mean particle size of the dispersed particles has to be fine, desirably less than 2.0 $\mu$m. This dispersion effect can reduce chipping during machining and can reduce dropping from the head while flying. Further, dispersion of the oxide is necessary in view of the adhesion with an oxide insulation layer formed on the substrate, but, if it exceeds 40 vol %, the oxide becomes ineffective as a dispersion, and chipping increases due to the increase of the resistance to the cutting step of fabrication.

Referring to the results of a sliding test between the disk and the slider, if the oxide phase is incorporated by more than 40 vol %, coagulation of the lubricant is generated on the sliding surface. An oxide such as $Al_2O_3$, $Cr_2O_3$ or $ZrO_2$ may result in a similar effect either by adding alone or in combination.

Oxygen and nitrogen as the solid solubilization ingredients act to assist in the sintering of the matrix phase of the carbide. The addition of oxygen and/or nitrogen enables sintering at low temperatures, by which a matrix phase having voidless and fine micro-structure can be obtained. Oxygen acts on dispersed oxide particles to increase the bonding force at the boundary between the carbide of the matrix and the dispersed oxide, and contributes to the prevention of falling dispersed particles during machining and to improved toughness in the materials. Further, the addition of nitrogen also acts effectively in refining the structure, and its densifying effect is promoted by combined use with oxygen.

The upper limit for the solid solution amount of oxygen and/or nitrogen is restricted in view of the workability of the substrate for cutting or polishing during fabrication. In $MeC_pO_qN_r$ wherein Me is one or more of Ti, W and Ta, the grinding property deteriorates from contact with the diamond grinding stone or diamond grinding particle to give an undesired effect on the fabrication accuracy of a magnetic head, if $q>0.4$ or $r>0.2$ in individual addition of oxygen or nitrogen, or $q>0.4$ being converted into oxygen in the case of solid solubilization of both of oxygen and nitrogen elements since double the undesired effects are exerted when compared with cutting in the case of nitrogen. Oxygen has a densifying effect at $0.005 \leq p$. Further, the content of C has an effect on the hardness of the substrate and it is necessary that $p \geq 0.5$, be restricted in view of wear resistance and slidability as the magnetic head.

The substrate material for the magnetic head according to the present invention can be obtained by blending a carbide powder of TiC, WC and TaC as the matrix phase, one or more of oxides of $Al_2O_3$, $Cr_2O_3$ and $ZrO_2$ as the dispersion phase, and a $TiO_2$ or TiN powder as a supply source for the solid-solubilization ingredient of oxygen and/or nitrogen each in a predetermined amount, uniformly mixing them by a ball mill or attritor and sintering the thus obtained powder with a hot pressing or hot isostatic pressing sintering method (HIP).

For the carbide phase, a single carbide such as TiC, WC or TaC or a composite carbide such as (Ti, Ta)C, (W, Ti)C, and (Ti, W, Ta)C may be used.

Further, oxygen and nitrogen may be solid-solubilized during sintering by using a powder as the supply source for the solid solubilization ingredient as described above, but an excellent substrate material can be obtained by using a powder prepared by previously mixing a carbide powder and a powder as the supply source for the solid solubilization ingredients of oxygen and nitrogen each in a predetermined amount, and synthesizing them under heat in an atmosphere such as a vacuum, inert gas, CO, $CO_2$, $N_2$ or $CF_4$.

EXAMPLE 1

To examine the effect on chipping of adding oxide to the carbide phase during machining of a substrate, a groove fabrication test was conducted. Specimens used for evaluation are as shown in Table 1.

TABLE 1

| | TiC (vol %) | $(Ti_{0.7}W_{0.3})C$ (vol %) | $(Ti_{0.7}W_{0.2}Ta_{0.1})C$ (vol %) | $Al_2O_3$ (vol %) | $Cr_2O_3$ (vol %) | $ZrO_2$ (vol %) | complete chipping Number (N) | incomplete chipping number (N) | fabrication resistance (W) | Lubricant coagulation | Max friction effiency | Remarks |
|---|---|---|---|---|---|---|---|---|---|---|---|---|
| 1 | 32 | | | 68 | | | 187 | 26 | 53 | x | 0.7 | Comp. Example |
| 2 | 50 | | | 50 | | | 165 | 24 | 42 | x | 0.7 | Comp. Example |
| 3 | 60 | | | 40 | | | 85 | 2 | 22 | o | 0.4 | This Invention |
| 4 | 70 | | | 30 | | | 64 | 0 | 17 | o | 0.3 | This Invention |
| 5 | 90 | | | 10 | | | 89 | 3 | 15 | o | 0.3 | This Invention |
| 6 | 95 | | | 5 | | | 96 | 5 | 15 | o | 0.3 | This Invention |
| 7 | 98 | | | 2 | | | 145 | 18 | 16 | o | 0.3 | Comp. Example |
| 8 | 50 | | | | 50 | | 205 | 23 | 41 | x | 0.7 | Comp. Example |
| 9 | 60 | | | | 40 | | 76 | 4 | 22 | o | 0.3 | This Invention |
| 10 | 70 | | | | 30 | | 52 | 1 | 15 | o | 0.3 | This Invention |
| 11 | 95 | | | | 5 | | 69 | 4 | 15 | o | 0.3 | This Invention |
| 12 | 98 | | | | 2 | | 130 | 15 | 14 | o | 0.3 | Comp. Example |
| 13 | 50 | | | | | 50 | 198 | 29 | 46 | x | 0.7 | Comp. Example |
| 14 | 60 | | | | | 40 | 91 | 3 | 23 | o | 0.3 | This Invention |
| 15 | 70 | | | | | 30 | 56 | 0 | 16 | o | 0.3 | This Invention |

TABLE 1-continued

| TiC (vol %) | $(Ti_{0.7}W_{0.3})C$ (vol %) | $(Ti_{0.7}W_{0.2}Ta_{0.1})C$ (vol %) | $Al_2O_3$ (vol %) | $Cr_2O_3$ (vol %) | $ZrO_2$ (vol %) | complete chipping Number (N) | incomplete chipping number (N) | fabrication resistance (W) | Lubricant coagulation | Max friction effiency | Remarks |
|---|---|---|---|---|---|---|---|---|---|---|---|
| 16 | 95 | | | | 5 | 87 | 2 | 17 | ○ | 0.3 | This Invention |
| 17 | 98 | | | | 2 | 124 | 15 | 14 | ○ | 0.3 | Comp. Example |
| 18 | | 50 | | 50 | | 208 | 38 | 39 | x | 0.7 | Comp. Example |
| 19 | | 60 | | 40 | | 92 | 5 | 21 | ○ | 0.3 | This Invention |
| 20 | | 70 | | 30 | | 71 | 1 | 14 | ○ | 0.3 | This Invention |

(Preparation of specimen material)

A powder having a purity of 99.95% or higher and a mean particle size of 1 μm or less was used as an oxide powder, and a solid solubilized powder of TiC, $(Ti_{0.7}W_{0.3})C$ or $(Ti_{0.7}W_{0.2}Ta_{0.1})C$ was used as a carbide powder. Each of the powders was wet mixed by using an attritor to obtain a predetermined blending composition. After mixing, a powder to be used for sintering was conditioned by using a spray drier so that ingredients were not separated. After uniformly charging the powder into a graphite mold, it was sintered with a hot pressing method. Following sintering, chipping was evaluated after planar surface polishing. Evaluation conditions for the chipping were as below.

(Condition for Cutting Test)

Grinding stone: SD #800 metal bond
Number of rotation: 10 krpm
Feed rate: 150 mm/min
Groove depth: 0.2 mm The amount of chipping of 5 μm or longer and the number of incomplete chippings found in a cutting distance of 9 mm length were determined. At the same time, cutting resistance was also determined by measuring the load power on the spindle during cutting.

Figure 2:
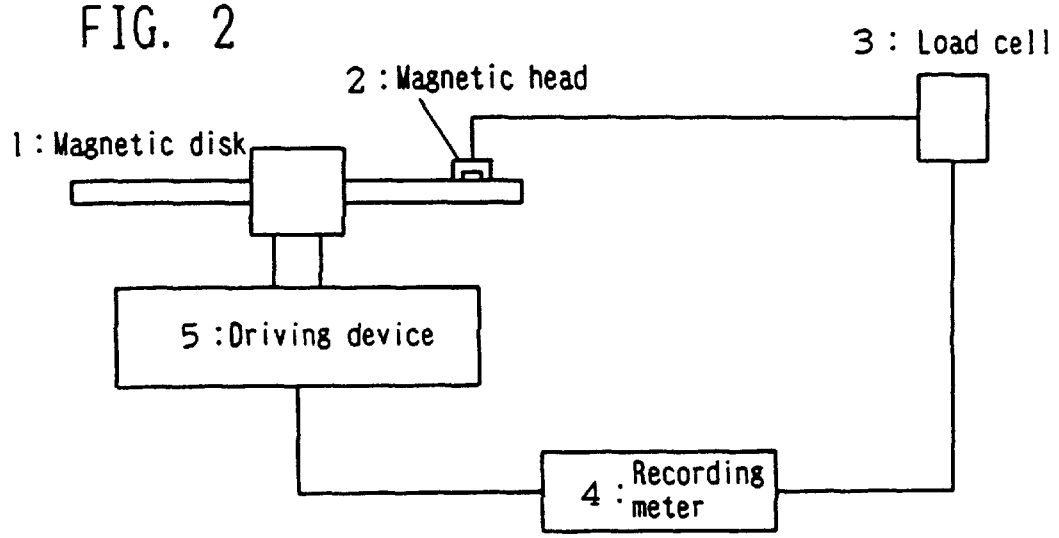
FIG. 2 is a schematic view showing a disk comprising amorphous carbon formed on a glass substrate in a drag test.

Further, to examine the reaction and coagulation between a slider material and a lubricant in HDI, after setting a slider manufactured from materials shown in Table 1 and a disk comprising amorphous carbon (sputtered film) formed on a glass substrate as shown in FIG. 2, a drug test was carried out. A lubricant (perfluoropolyether) was coated on the surface of the disk. In the drug test, the head was rotated for 10 sec at 100 rpm while being urged under a load of 5 g to the disk. After stopping for one minute, it was rotated at 5 rpm to determine a friction coefficient. The test was repeated 20,000 times, each time comprising the foregoing procedures. After the completion of the test, the sliding surface was observed. Test conditions are shown collectively below.

(Test conditions for frictional wear)

Number of rotation: 100 rpm
Test cycle: 20,000 cycles
Urging load: 5 g
Head shape: 50% slider
Disk shape: φ 3.5 (sputtered carbon film was vapor deposited)
Lubricant: perfluoropolyether (PFPE)

Results of the test described above are shown in Tables 1, 2 and 3.

TABLE 2

| TiC (vol %) | $(Ti_{0.7}W_{0.3})C$ (vol %) | $(Ti_{0.7}W_{0.2}Ta_{0.1})C$ (vol %) | $Al_2O_3$ (vol %) | $Cr_2O_3$ (vol %) | $ZrO_2$ (vol %) | complete chipping Number (N) | incomplete chipping number (N) | fabrication resistance (W) | Lubricant coagulation | Max friction effiency | Remarks |
|---|---|---|---|---|---|---|---|---|---|---|---|
| 21 | 95 | | 5 | | | 90 | 4 | 15 | ○ | 0.3 | This invention |
| 22 | 98 | | 2 | | | 148 | 16 | 15 | ○ | 0.3 | Comp. Example |
| 23 | 70 | | | 30 | | 72 | 2 | 16 | ○ | 0.3 | This invention |
| 24 | 70 | | | | 30 | 65 | 0 | 14 | ○ | 0.3 | This invention |
| 25 | | 50 | 50 | | | 182 | 27 | 37 | x | 0.7 | Comp. Example |
| 26 | | 60 | 40 | | | 96 | 8 | 19 | ○ | 0.3 | This invention |
| 27 | | 70 | 30 | | | 54 | 0 | 14 | ○ | 0.3 | This invention |
| 28 | | 95 | 5 | | | 95 | 6 | 13 | ○ | 0.3 | This invention |
| 29 | | 98 | 2 | | | 131 | 14 | 13 | ○ | 0.3 | Comp. Example |
| 30 | | 70 | | 30 | | 59 | 1 | 14 | ○ | 0.3 | This invention |
| 31 | | 70 | | | 30 | 49 | 0 | 12 | ○ | 0.3 | This invention |
| 32 | 70 | | 20 | 10 | | 67 | 1 | 17 | ○ | 0.3 | This invention |
| 33 | 70 | | 20 | | 10 | 69 | 1 | 15 | ○ | 0.3 | This invention |
| 35 | 70 | | 10 | 10 | 10 | 59 | 2 | 22 | ○ | 0.3 | This invention |
| 36 | 95 | | 3 | 2 | | 88 | 4 | 17 | ○ | 0.3 | This invention |
| 37 | 95 | | 3 | | | 87 | 6 | 15 | ○ | 0.3 | This invention |
| 38 | 95 | | 2 | 2 | 1 | 91 | 4 | 15 | ○ | 0.3 | This invention |
| 39 | | 70 | 20 | 10 | | 62 | 1 | 15 | ○ | 0.3 | This invention |
| 40 | | 70 | 20 | | 10 | 65 | 2 | 17 | ○ | 0.3 | This invention |
| 41 | | 70 | 10 | 10 | 10 | 54 | 0 | 14 | ○ | 0.3 | This invention |

TABLE 3

| TiC (vol %) | (Ti$_{0.7}$W$_{0.3}$)C (vol %) | (Ti$_{0.7}$W$_{0.2}$Ta$_{0.1}$)C (vol %) | Al$_2$O$_3$ (vol %) | Cr$_2$O$_3$ (vol %) | ZrO$_2$ (vol %) | complete chipping Number (N) | incomplete chipping number (N) | fabrication resistance (W) | Lubricant coagulation | Max friction effiency | Remarks |
|---|---|---|---|---|---|---|---|---|---|---|---|
| 42 | 95 | | 3 | 2 | | 87 | 4 | 19 | ○ | 0.3 | This invention |
| 43 | 95 | | 3 | | 2 | 91 | 3 | 17 | ○ | 0.4 | This invention |
| 44 | 95 | | 2 | 2 | 1 | 85 | 3 | 14 | ○ | 0.3 | This invention |
| 45 | | 70 | 20 | 10 | | 59 | 1 | 14 | ○ | 0.3 | This invention |
| 46 | | 70 | 20 | | 10 | 62 | 3 | 16 | ◉ | 0.3 | This invention |
| 47 | | 70 | 10 | 10 | 10 | 65 | 3 | 17 | ○ | 0.3 | This invention |
| 48 | | 95 | 3 | 2 | | 92 | 4 | 18 | ○ | 0.3 | This invention |
| 49 | | 95 | 3 | | 2 | 83 | 7 | 18 | ○ | 0.3 | This invention |
| 50 | | 95 | 2 | 2 | 1 | 87 | 5 | 15 | ○ | 0.3 | This invention |

First, referring to the results of the fabrication resistance test and the chipping test during fabrication, the fabrication resistance is reduced along with the increase in content of all carbides TiC, (Ti,W)C, and (Ti,W,Ta)C when using the carbide as the matrix phase. Materials which provide excellent cutting fabrication can be obtained, showing a cutting resistance of 25 W or less at 60 vol % or more of the carbide phase, and more particularly, a cutting resistance of 20 W or less at 75 vol % or more.

Additionally, during the cutting step of fabrication, a lot of chippings are observed and no dispersion effect from the oxide on the toughness can be seen if the added amount of oxide is 5 vol % or less.

Furthermore, if the content of the oxide is 40 vol % or more, the amount of oxide is predominant and the effect of the dispersion is not observed, and chipping is increased due to the increase in cutting resistance.

Referring to the results of the sliding test between the disk and the slider, if the oxide phase is contained by 40 vol % or more, coagulation of the lubricant to the sliding surface is generated, the maximum frictional coefficient is increased, and it can be seen that excellent characteristics in view of HDI can be obtained when the carbide constitutes the matrix phase. It is reported that this is because, if the oxide phase constitutes the main portion, it functions to decompose the perfluoropolyether (PFPE), and it is accordingly assumed that this is concerned with the function. Electroconductivity was observed in all of the specimens except for specimen No. 1.

As described above, it has been found that the substrate for the magnetic head comprising the carbide phase of one or more of Ti, W, and Ta as the matrix phase, the matrix phase being incorporated from 60 vol % to 95 vol %, in which Al$_2$O$_3$, Cr$_2$O$_3$, ZrO$_2$ are dispersed, has a conductivity, shows less machining resistance and causes less occurrence of chipping, so that it provides excellent discharge breakdown resistance and thermal asperity resistance. Furthermore, it has also been found that the substrate has a coagulation resistance with the lubricant used for HDI.

EXAMPLE 2

In a substrate for a magnetic head comprising a carbide as a matrix phase, the effect of substitutional solid solubilization of W and Ta in the TiC phase on the physical properties such as rigidity and heat conductivity, and deformation during machining was examined. Test specimens are shown in Tables 4 and 5, which were provisionally prepared with the same method as in Example 1. However, a solid solubilized carbon powder was used already in the starting powder for the material having a solid solubilized carbide phase. For heat conductivity, the effect of the ratio of Ti, W, and Ta was examined in a system containing 70 vol % of the carbide and 30 vol % of Al$_2$O$_3$.

(Test for Fabrication Deformation)

Grinding stone: SD #800 metal bond

Number of rotations: 10 krpm

Feed rate: 150 mm/min

Specimens in Tables 4 and 5 each having 50 mm width—2 mm thickness were sliced at 0.4 mm width, and maximum deformation was determined. Ten slices were formed for one specimen and an average value was determined as the fabrication deformation of the material.

(Test for reactive ion etching)

Bias voltage: 800 V

Reaction gas: CF$_4$

Fabrication time: 15 min

Each specimen of 20 mm×20 mm×1.2 mm was polished, surface roughness was measured before and after reactive ion etching, and the change in surface roughness was examined.

(Physical property)

Rigidity was measured with a bending deformation method, and heat conductivity was measured with a laser flash method.

Test results are shown in Tables 4, 5.

TABLE 4

| | (Ti$_j$, W$_m$, Ta$_n$)C (vol %) | j | m | n | Al$_2$O$_3$ (vol %) | Cr$_2$O$_3$ (vol %) | ZrO$_2$ (vol %) | Young's modulus (GPa) | Heat conductivity (w/mk) | Fabrication deformation (μm) | Etching surface roughness (A) | Remarks |
|---|---|---|---|---|---|---|---|---|---|---|---|---|
| 1 | 70 | 1 | 0 | 0 | 30 | | | 430 | 30 | 92 | 90 | This invention |
| 2 | 70 | 0.8 | 0.2 | 0 | 30 | | | 470 | 44 | 88 | 92 | This invention |
| 3 | 70 | 0.6 | 0.4 | 0 | 30 | | | 520 | 62 | 82 | 88 | This invention |
| 4 | 70 | 0.5 | 0.5 | 0 | 30 | | | 550 | 70 | 71 | 94 | This invention |

TABLE 4-continued

| | (Ti$_j$, W$_m$, Ta$_n$)C (vol %) | j | m | n | Al$_2$O$_3$ (vol %) | Cr$_2$O$_3$ (vol %) | ZrO$_2$ (vol %) | Young's modulus (GPa) | Heat conductivity (w/mk) | Fabrication deformation ($\mu$m) | Etching surface roughness (A) | Remarks |
|---|---|---|---|---|---|---|---|---|---|---|---|---|
| 5  | 70 | 0.4 | 0.6 | 0   | 30 | | | 580 | 77 | 65 | 122 | Comp. Example |
| 6  | 70 | 0.3 | 0.7 | 0   | 30 | | | 610 | 82 | 61 | 135 | Comp. Example |
| 7  | 70 | 0.2 | 0.3 | 0.5 | 30 | | | 580 | 88 | 60 | 125 | Comp. Example |
| 8  | 70 | 0.4 | 0.3 | 0.3 | 30 | | | 540 | 50 | 66 | 88  | This invention |
| 9  | 70 | 0.6 | 0.3 | 0.1 | 30 | | | 510 | 55 | 71 | 89  | This invention |
| 10 | 70 | 0   | 0   | 1   | 30 | | | 520 | 40 | 79 | 97  | This invention |
| 11 | 70 | 0   | 0.1 | 0.9 | 30 | | | 540 | 44 | 77 | 84  | this invention |
| 12 | 70 | 0   | 0.2 | 0.8 | 30 | | | 560 | 48 | 69 | 118 | Comp. Example |
| 13 | 90 | 1   | 0   | 0   | 10 | | | 450 | — | 89 | 89  | This invention |
| 14 | 90 | 0.5 | 0.5 | 0   | 10 | | | 480 | — | 85 | 85  | This invention |
| 15 | 90 | 0.4 | 0.6 | 0   | 10 | | | 510 | — | 68 | 124 | Comp. Example |
| 16 | 90 | 0.2 | 0.3 | 0.5 | 10 | | | 600 | — | 66 | 120 | Comp. Example |
| 17 | 90 | 0.4 | 0.3 | 0.3 | 10 | | | 560 | — | 69 | 87  | This invention |
| 18 | 90 | 0   | 0   | 1   | 10 | | | 530 | — | 74 | 92  | This invention |
| 19 | 90 | 0   | 0.1 | 0.9 | 10 | | | 560 | — | 73 | 95  | This invention |
| 20 | 70 | 1   | 0   | 0   |    | 30 | | 430 | — | 96 | 94  | This invention |

TABLE 5

| | (Ti$_j$, W$_m$, Ta$_n$)C (vol %) | j | m | n | Al$_2$O$_3$ (vol %) | Cr$_2$O$_3$ (vol %) | ZrO$_2$ (vol %) | Young's modulus (GPa) | Heat conductivity (w/mk) | Fabrication deformation ($\mu$m) | Etching surface roughness (A) | Remarks |
|---|---|---|---|---|---|---|---|---|---|---|---|---|
| 21 | 70 | 0.5 | 0.5 | 0   | | 30 | | 550 | — | 74 | 89  | This invention |
| 22 | 70 | 0.4 | 0.6 | 0   | | 30 | | 580 | — | 68 | 132 | Comp. Example |
| 23 | 70 | 0.2 | 0.3 | 0.5 | | 30 | | 580 | — | 64 | 134 | Comp. Example |
| 24 | 70 | 0.4 | 0.3 | 0.3 | | 30 | | 540 | — | 69 | 88  | This invention |
| 25 | 70 | 0   | 0   | 1   | | 30 | | 520 | — | 71 | 79  | This invention |
| 26 | 70 | 0   | 0.1 | 0.9 | | 30 | | 540 | — | 69 | 87  | This invention |
| 27 | 70 | 1   | 0   | 0   | | | 30 | 430 | — | 94 | 86  | This invention |
| 28 | 70 | 0.5 | 0.5 | 0   | | | 30 | 550 | — | 73 | 80  | This invention |
| 29 | 70 | 0.4 | 0.6 | 0   | | | 30 | 580 | — | 66 | 124 | Comp. Example |
| 30 | 70 | 0.2 | 0.3 | 0.5 | | | 30 | 580 | — | 67 | 122 | Comp. Example |
| 31 | 70 | 0.4 | 0.3 | 0.3 | | | 30 | 540 | — | 66 | 90  | This invention |
| 32 | 70 | 0   | 0   | 1   | | | 30 | 520 | — | 74 | 87  | This invention |
| 33 | 70 | 0   | 0.2 | 0.8 | | | 30 | 540 | — | 73 | 80  | This invention |
| 34 | 30 | 1   | 0   | 0   | 70 | | | 380 | — | 142 | 130 | Comp. Example |
| 35 | 50 | 1   | 0   | 0   | 50 | | | 400 | — | 121 | 127 | Comp. Example |

Young's modulus (rigidity) as the physical property increases along with the solid solubilization of W and Ta, while heat conductivity increases along with solid solubilization of W. Deformation upon fabrication shows a value of 100 $\mu$m or less when the carbide is a matrix phase, and deformation decreases along with solid solubilization of W and Ta. The decreasing fabrication deformation is believed to be caused by the decrease of fabrication resistance (Example 1) and the increase of Young's modulus when the carbide phase is a matrix phase. However, in the reactive etching used for the fabrication of an ABS surface of the head, surface roughness after etching increases as the amount of W and Ta is increased. This is because the carbide phase comprises a multi-phase if the limit of solid solubilization into TiC is exceeded, and the surface is roughened by the difference of the etching rate between each of the phases. Accordingly, the ranges for the ingredients of the constituent phase in (Ti$_j$W$_m$Ta$_n$)C$_x$ as the carbide matrix phase are:

$$j+m+n=1,\ 0\leq j\leq 1,\ 0\leq m\leq 0.5,\ 0\leq n\leq 1,\ \text{and}\ 0.5\leq x\leq 1.$$

EXAMPLE 3

In a substrate for a magnetic head in which an oxide is dispersed into a carbide as a matrix phase, the effect of oxygen and nitrogen as substitutional solid-solubilization ingredients in the C site of the carbide phase on the residual void (sinterability) and the cutting fabricability was examined. Test specimens are shown in Tables 6 and 7.

TABLE 6

| | MeCpOqNr (vol %) | p | q | r | Al$_2$O$_3$ (vol %) | Cr$_2$O$_3$ (vol %) | ZrO$_2$ (vol %) | Complete chipping number (N) | incomplete chipping number (N) | Fabrication resistance (W) | Void number | Remarks |
|---|---|---|---|---|---|---|---|---|---|---|---|---|
| 1 | Me:Ti70 | 1   | 0   | 0 | 30 | | | 64 | 0 | 17 | 35 | This invention |
| 2 | 70      | 0.9 | 0.1 | 0 | 30 | | | 68 | 0 | 22 | 28 | This invention |
| 3 | 70      | 0.7 | 0.3 | 0 | 30 | | | 82 | 1 | 25 | 23 | This invention |

TABLE 6-continued

| | MeCpOqNr (vol %) | p | q | r | Al₂O₃ (vol %) | Cr₂O₃ (vol %) | ZrO₂ (vol %) | Complete chipping number (N) | incomplete chipping number (N) | Fabrication resistance (W) | Void number | Remarks |
|---|---|---|---|---|---|---|---|---|---|---|---|---|
| 4 | 70 | 0.5 | 0.5 | 0 | 30 | | | 99 | 8 | 41 | 19 | Comp. Example |
| 5 | 70 | 0.9 | 0 | 0.1 | 30 | | | 63 | 1 | 25 | 30 | This invention |
| 6 | 70 | 0.8 | 0 | 0.2 | 30 | | | 68 | 1 | 28 | 28 | This invention |
| 7 | 70 | 0.7 | 0 | 0.3 | 30 | | | 102 | 10 | 42 | 25 | Comp. Example |
| 8 | 70 | 0.5 | 0.3 | 0.2 | 30 | | | 123 | 16 | 58 | 20 | Comp. Example |
| 9 | 70 | 0.4 | 0.3 | 0.3 | 30 | | | 110 | 13 | 54 | 17 | Comp. Example |
| 10 | 70 | 0.5 | 0.1 | 0.1 | 30 | | | 71 | 0 | 27 | 23 | This invention |
| 11 | 70 | 0.5 | 0.3 | 0 | 30 | | | 64 | 1 | 25 | 22 | This invention |
| 12 | 70 | 0.7 | 0.2 | 0.1 | 30 | | | 68 | 1 | 28 | 25 | This invention |
| 13 | 70 | 0.5 | 0.4 | 0.1 | 30 | | | 102 | 9 | 43 | 18 | Comp. Example |
| 14 | 70 | 0.7 | 0.3 | 0 | | 30 | | 80 | 1 | 24 | 24 | This invention |
| 15 | 70 | 0.5 | 0.5 | 0 | | 30 | | 96 | 7 | 43 | 17 | Comp. Example |
| 16 | 70 | 0.8 | 0 | 0.2 | | 30 | | 69 | 1 | 28 | 25 | This invention |
| 17 | 70 | 0.7 | 0 | 0.3 | | 30 | | 105 | 11 | 40 | 24 | Comp. Example |
| 18 | 70 | 0.7 | 0.2 | 0.1 | | 30 | | 65 | 1 | 27 | 26 | This invention |
| 19 | 70 | 0.5 | 0.4 | 0.1 | | 30 | | 103 | 9 | 42 | 17 | Comp. Example |
| 20 | 70 | 0.4 | 0.3 | 0.3 | | 30 | | 115 | 15 | 53 | 19 | Comp. Example |

TABLE 7

| | MeCpOqNr (vol %) | p | q | r | Al₂O₃ (vol %) | Cr₂O₃ (vol %) | ZrO₂ (vol %) | Complete chipping number (N) | incomplete chipping number (N) | Fabrication resistance (W) | Void number | Remarks |
|---|---|---|---|---|---|---|---|---|---|---|---|---|
| 21 | 70 | 0.7 | 0.3 | 0 | | | 30 | 82 | 2 | 22 | 24 | This invention |
| 22 | 70 | 0.5 | 0.5 | 0 | | | 30 | 100 | 9 | 45 | 15 | Comp. Example |
| 23 | 70 | 0.8 | 0 | 0.2 | | | 30 | 61 | 0 | 26 | 26 | This invention |
| 24 | 70 | 0.7 | 0 | 0.3 | | | 30 | 104 | 10 | 41 | 25 | Comp. Example |
| 25 | 70 | 0.7 | 0.2 | 0.1 | | | 30 | 67 | 1 | 25 | 25 | This invention |
| 26 | 70 | 0.5 | 0.4 | 0.1 | | | 30 | 109 | 10 | 43 | 18 | Comp. Example |
| 27 | 70 | 0.4 | 0.3 | 0.3 | | | 30 | 118 | 15 | 55 | 20 | Comp. Example |
| 28 | Me:Ti, W70 | 0.7 | 0.3 | 0 | 30 | | | 74 | 1 | 21 | 24 | This invention |
| 29 | 70 | 0.5 | 0.5 | 0 | 30 | | | 102 | 9 | 44 | 17 | Comp. Example |
| 30 | 70 | 0.8 | 0 | 0.2 | 30 | | | 64 | 1 | 25 | 25 | This invention |
| 31 | 70 | 0.7 | 0 | 0.3 | 30 | | | 100 | 9 | 39 | 39 | Comp. Example |
| 32 | 70 | 0.7 | 0.2 | 0.1 | 30 | | | 70 | 2 | 27 | 24 | This invention |
| 33 | 70 | 0.5 | 0.4 | 0.1 | 30 | | | 110 | 11 | 42 | 41 | Comp. Example |
| 34 | 70 | 0.4 | 0.3 | 0.3 | 30 | | | 121 | 14 | 54 | 58 | Comp. Example |
| 35 | Me:Ti, W, Ta70 | 0.7 | 0.3 | 0 | 30 | | | 72 | 1 | 22 | 25 | This invention |
| 36 | 70 | 0.5 | 0.5 | 0 | 30 | | | 107 | 10 | 44 | 18 | Comp. Example |
| 37 | 70 | 0.8 | 0 | 0.2 | 30 | | | 63 | 0 | 25 | 24 | This invention |
| 38 | 70 | 0.7 | 0 | 0.3 | 30 | | | 105 | 9 | 43 | 26 | Comp. Example |
| 39 | 70 | 0.5 | 0.3 | 0.2 | 30 | | | 67 | 1 | 25 | 26 | This invention |
| 40 | 70 | 0.5 | 0.4 | 0.1 | 30 | | | 110 | 10 | 42 | 15 | Comp. Example |
| 41 | 70 | 0.4 | 0.3 | 0.3 | 30 | | | 127 | 13 | 54 | 19 | Comp. Example |

The method of trial preparation is the same as Example 1. For oxygen and nitrogen, a powder prepared by previously mixing a carbide powder and other powders as a supply source for oxygen or nitrogen each in a predetermined amount and previously synthesized under heat in an inert gas atmosphere was used. Evaluation for chipping upon cutting fabrication and fabrication resistance was conducted in the same manner. The residual void was determined by observing a $3.5 \times 10^4 (\mu m^2)$ surface with a scanning type electron microscope (SEM) for the polished surface and counting the number.

The results are shown in Tables 6, 7.

It has been found that both oxygen and nitrogen elements promote sintering of a system comprising the carbide as the matrix phase and oxide dispersed therein, and reduces the residual void. However, the addition of large amounts increases cutting resistance and, as a result, increases chipping. Thus, it is necessary to keep within such ranges as: $0 \leq q \leq 0.4$ and $0 \leq r \leq 0.2$ Further, for the amount of C, $p \geq 0.5$ is necessary in view of the hardness of the carbide phase.

In the present invention, since a substrate is formed as the composite material using the carbide phase comprising one or more of Ti, W, and Ta as the matrix phase and one or more oxide of $Al_2O_3$, $Cr_2O_3$, and $ZrO_2$ as the dispersion phase, the following advantageous effects can be obtained.

(1) MR and GMR elements can be protected against discharge destruction at a low voltage by providing the substrate with conductivity.

(2) The problem of thermal asperity for MR and GMR elements can be avoided since fabrication resistance and chipping can be reduced in the cutting step of the magnetic head, and because of the high heat conductivity. Accordingly, a magnetic head of high reliability can be obtained.

(3) A magnetic head which is stable and highly reliable in a pseudo contact recording system or contact recording system can be obtained, since there are no reactions/coagulations relative to a lubricant.

(4) Fabrication for controlling the height of magnetic poles which would lead to a problem in the size reduction or adoption of MR or GMR elements in the future can be facilitated because of its high rigidity.

(5) Since the material has a dense and fine structure, it has high fabrication rate and good surface property after fabrication, so that a superior magnetic head can be manufactured.

What is claimed is:

1. A substrate material for a magnetic head comprising a matrix phase of a carbide of one or more of Ti, W and Ta, and a dispersion phase of an oxide of one or more of $Al_2O_3$, $Cr_2O_3$ and $ZrO_2$ in which said material comprises from 60 vol % to 95 vol % of the matrix phase of the carbide and one or both of oxygen and nitrogen is solid-solubilized in the carbide MeC of the matrix phase wherein Me is one or more of Ti, W and Ta, and the solid solubilization amount is:

$0.5 \leq p+q=r \leq 1$, $0.5 \leq p \leq 1$, $0 \leq q \leq 0.4$ and $0 \leq r \leq 0.2$ in Me $C_p O_q N_r$.

2. A substrate material for a magnetic head comprising a matrix phase of a carbide of one or more of Ti, W and Ta, and a dispersion phase of an oxide of one or more of $Al_2O_3$, $Cr_2O_3$ and $ZrO_2$ in which said material comprises from 60 vol % to 95% of the matrix phase of the carbide, and wherein the ingredients of the carbide in the matrix phase comprise a single phase of $(Ti_j W_m Ta_n)C_x$ in which $j+m+n=1$, $0 \leq j \leq 1$, $0 \leq m \leq 0.5$, $0 \leq n \leq 1$, and $0.5 \leq x \leq 1$.

3. The substrate material of claim 1 wherein oxygen is solid-solubilized in the carbide MeC of the matrix phase.

4. The substrate material of claim 1 wherein nitrogen is solid-solubilized in the carbide MeC of the matrix phase.

5. The substrate material of claim 1 wherein both oxygen and nitrogen are solid-solubilized in the carbide MeC of the matrix phase.

* * * * *